United States Patent
Xiao et al.

(10) Patent No.: US 12,021,221 B2
(45) Date of Patent: Jun. 25, 2024

(54) ELECTRODE ARCHITECTURE FOR FAST CHARGING

(71) Applicant: GM GLOBAL TECHNOLOGY OPERATIONS LLC, Detroit, MI (US)

(72) Inventors: Xingcheng Xiao, Troy, MI (US); Hongliang Wang, Sterling Heights, MI (US); Gayatri V. Dadheech, Bloomfield Hills, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 435 days.

(21) Appl. No.: 17/097,483

(22) Filed: Nov. 13, 2020

(65) Prior Publication Data

US 2022/0158167 A1 May 19, 2022

(51) Int. Cl.
| | |
|---|---|
| *H01M 4/133* | (2010.01) |
| *H01M 4/02* | (2006.01) |
| *H01M 4/1393* | (2010.01) |
| *H01M 4/36* | (2006.01) |
| *H01M 4/587* | (2010.01) |
| *H01M 4/62* | (2006.01) |
| *H01M 4/66* | (2006.01) |
| *H01M 10/0525* | (2010.01) |

(52) U.S. Cl.
CPC ......... *H01M 4/133* (2013.01); *H01M 4/1393* (2013.01); *H01M 4/366* (2013.01); *H01M 4/587* (2013.01); *H01M 4/62* (2013.01); *H01M 4/663* (2013.01); *H01M 10/0525* (2013.01); *H01M 2004/027* (2013.01)

(58) Field of Classification Search
CPC ...... H01M 4/133; H01M 4/366; H01M 4/587; H01M 4/663; H01M 10/0525; H01M 2004/027

See application file for complete search history.

(56) References Cited

U.S. PATENT DOCUMENTS

| | | | |
|---|---|---|---|
| 8,974,946 | B2 | 3/2015 | Cai et al. |
| 9,123,939 | B2 | 9/2015 | Xiao et al. |
| 9,160,036 | B2 | 10/2015 | Yang et al. |
| 9,252,411 | B2 | 2/2016 | Abd Elhamid et al. |
| 9,302,914 | B2 | 4/2016 | Liu et al. |
| 9,362,552 | B2 | 6/2016 | Sohn et al. |
| 9,373,829 | B2 | 6/2016 | Xiao et al. |
| 9,437,871 | B2 | 9/2016 | Zhou et al. |
| 9,537,144 | B2 | 1/2017 | Huang et al. |
| 9,742,028 | B2 | 8/2017 | Zhou et al. |
| 9,896,763 | B2 | 2/2018 | Dadheech et al. |
| 9,905,847 | B2 | 2/2018 | Dadheech et al. |

(Continued)

FOREIGN PATENT DOCUMENTS

| | | |
|---|---|---|
| CN | 114497449 A | 5/2022 |
| DE | 102021113951 A1 | 5/2022 |

*Primary Examiner* — Ula C Ruddock
*Assistant Examiner* — Armindo Carvalho, Jr.
(74) *Attorney, Agent, or Firm* — Harness, Dickey & Pierce, P.L.C.

(57) ABSTRACT

An electrode for an electrochemical cell is provided. The electrode includes a carbon membrane having a first face and an opposing second face, wherein at least a portion of the carbon membrane is modified to include an elevated number of nucleation sites for lithium relative to the carbon membrane when unmodified.

19 Claims, 10 Drawing Sheets

(56) References Cited

U.S. PATENT DOCUMENTS

| | | |
|---|---|---|
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 10,991,946 B2 | 4/2021 | Xiao et al. |
| 11,101,501 B2 | 8/2021 | Liu et al. |
| 11,239,459 B2 | 2/2022 | Yersak et al. |
| 2011/0286490 A1* | 11/2011 | Abrahamson .......... H01G 11/34 373/60 |
| 2013/0202945 A1* | 8/2013 | Zhamu .................. B82Y 30/00 429/188 |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0263379 A1* | 9/2015 | Xiao ................... H01M 10/052 205/59 |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2017/0179477 A1* | 6/2017 | Walters ................. H01M 4/136 |
| 2017/0222210 A1* | 8/2017 | Xiao ................... H01M 4/0457 |
| 2017/0271678 A1 | 9/2017 | Yang et al. |
| 2019/0027754 A1* | 1/2019 | Kamijo ................ H01M 4/587 |
| 2019/0341615 A1 | 11/2019 | Xiao et al. |
| 2019/0372155 A1 | 12/2019 | Yersak et al. |
| 2019/0393549 A1 | 12/2019 | Yersak et al. |
| 2020/0052338 A1 | 2/2020 | Liu et al. |
| 2020/0127282 A1 | 4/2020 | Yersak et al. |

\* cited by examiner

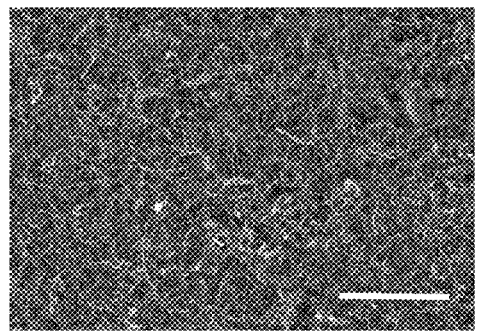 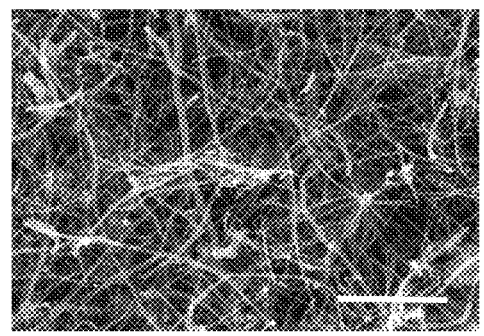
FIG. 8A　　　　　　　　FIG. 8B
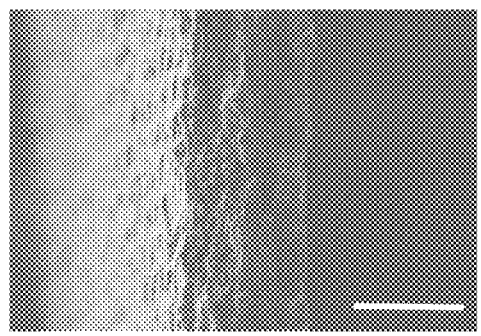
FIG. 8C
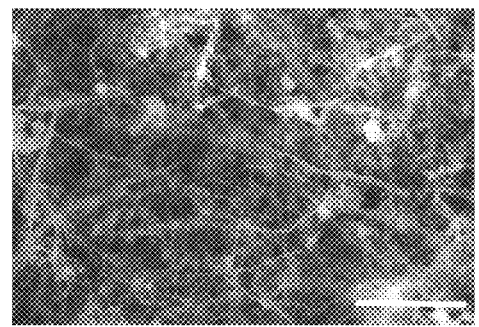
FIG. 9

ELECTRODE ARCHITECTURE FOR FAST CHARGING

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Lithium-ion batteries generally include two electrodes, a separator, and an electrolyte. One of the two electrodes serves as a positive electrode or cathode, and the other electrode serves as a negative electrode or anode. Lithium-ion batteries may also include various terminal and packaging materials. Many rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery.

Lithium is plated on and stripped from anodes during cycling of lithium-ion batteries. Therefore, it is beneficial to provide anode materials that do not exhibit substantial volume changes during cycling and that resist dendrite formation.

SUMMARY

This section provides a general summary of the disclosure, and is not a comprehensive disclosure of its full scope or all of its features.

The present disclosure relates to electrode architectures for fast charging.

In various aspects, the current technology provides an electrode including a carbon membrane having a first face and an opposing second face, wherein at least a portion of the carbon membrane is modified to include an elevated number of nucleation sites for lithium relative to the carbon membrane when unmodified.

In one aspect, the carbon membrane includes carbon nanotubes, carbon nanofibers, carbon paper, graphene paper, or combinations thereof.

In one aspect, substantially all of the carbon membrane is modified and the carbon membrane defines the electrode and a current collector.

In one aspect, the carbon membrane is substantially free of molecules covalently bonded to the carbon membrane.

In one aspect, a portion of at least one of the first face or the opposing second face of the carbon membrane is physically modified and at least a center portion of the carbon membrane is not modified and defines a current collector.

In one aspect, the carbon membrane is substantially free of molecules covalently bonded to the carbon membrane.

In one aspect, at least one of the first face or the second face is modified with a lithophilic layer and a center portion of the carbon membrane is not modified and defines a current collector.

In one aspect, the lithophilic layer individually includes silver (Ag), gold (Au), aluminum (Al), silicon (Si), tin (Sn), or combinations thereof.

In one aspect, at least one of the first face or the second face is modified with a dopant and a center portion of the carbon membrane is not modified and defines a current collector.

In one aspect, the dopant includes nitrogen (N), sulfur (S), phosphorous (P), boron (B), or combinations thereof.

In one aspect, the electrode is an anode.

In various aspects, the current technology also provides an electrochemical cell that cycles lithium ions, the electrochemical cell including the electrode.

In various aspects, the current technology additionally provides an electrode for an electrochemical cell, the electrode including a carbon material having a first face and an opposing second face, the carbon material including carbon nanotubes, carbon nanofibers, carbon paper, graphene paper, or combinations thereof, wherein at least a portion of the carbon material is modified to include an elevated number of nucleation sites for lithium relative to the carbon material when unmodified, and wherein the electrode exhibits a state of charge (SOC) of greater than or equal to about 75% after 15 minutes of charging.

In one aspect, the electrode further exhibits a volume change of less than or equal to about 20% during lithium plating and stripping.

In various aspects, the current technology further provides a method of fabricating an electrode, the method including obtaining a carbon material having a first face and an opposing second face, the carbon material including carbon nanotubes, carbon nanofibers, carbon paper, graphene paper, or combinations thereof, and modifying at least one face of the carbon material to generate a modified carbon material including an elevated number of nucleation sites for lithium relative to the carbon material when unmodified.

In one aspect, the modifying includes modifying substantially all of the carbon material by laser ablation, oxygen plasma, wet chemistry oxidation, or combinations thereof so that the modified carbon material defines the entire electrode.

In one aspect, the modifying includes modifying at least one of the first face or the second face by laser ablation, oxygen plasma, wet chemistry oxidation, or combinations thereof and not modifying a center portion of the carbon material between the first and second faces.

In one aspect, the modifying includes disposing a lithophilic layer on at least one of the first face or the second face and not modifying a center portion of the carbon material between the first and second faces, wherein the disposing is performed by electrochemical plating or vapor deposition.

In one aspect, the modifying includes doping at least one of the first face or the second face and not modifying a center portion of the carbon material between the first and second faces, wherein the doping includes doping with nitrogen by contacting with nitrogen-generated or ammonia-generated plasma, doping with sulfur by heat treating with phenyl disulfide, doping with phosphorous by heat treating with pentaphenylphosphole oxide, or doping with boron by heat treating with boric acid.

In one aspect, the method further includes incorporating lithium into the modified carbon material by vacuum infiltration, electrochemical plating, thermal evaporation, lithium foil lamination, or combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 8A is a micrograph showing a surface of a membrane including carbon nanotubes and carbon nanofibers. The scale bar is 30 µm.

FIG. 8B is a magnified micrograph of the surface of the membrane shown in FIG. 8A. The scale bar is 6 µm.

FIG. 8C is a micrograph showing a cross section of the membrane shown in FIGS. 8A-8B. The scale bar is 100 µm.

FIG. 9 is a micrograph showing a surface of an exemplary membrane including carbon nanotubes and carbon nanofibers, wherein the surface is modified in accordance with various aspects of the current technology. The scale bar is 6 µm.

Corresponding reference numerals indicate corresponding parts throughout the several views of the drawings.

DETAILED DESCRIPTION

Figure 1:
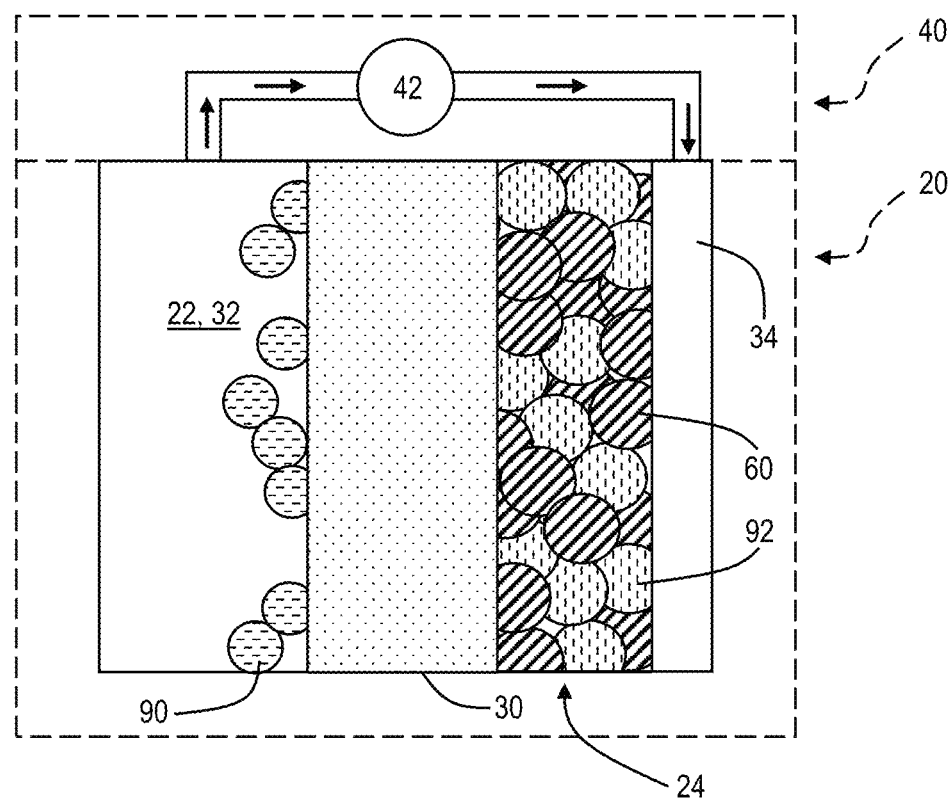
FIG. 1 is a schematic illustration of a lithium-ion battery in accordance with various aspects of the current technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first,"

"second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Lithium-metal electrodes expand and contract during cycling of lithium-ion electrodes. These volume changes lead to mossy surface structures, low cycle efficiency, dendrite growth, and high overpotential. Accordingly, the current technology provides an electrode having a high surface area that, when used as an anode in a lithium-ion battery, resists dendrite formation, reduces current density, and improves cycle life.

An exemplary and schematic illustration of an electrochemical cell 20 (also referred to herein as "the battery"), i.e., a lithium-ion cell, that cycles lithium ions is shown in FIG. 1. Unless specifically indicated otherwise, the term "ions" as used herein refers to lithium ions. The battery 20 includes a negative electrode (i.e., an anode) 22, a positive electrode (i.e., a cathode) 24, and a separator 30 (e.g., a microporous polymeric separator) disposed between the two electrodes 22, 24. An electrolyte is present throughout the separator 30 as a liquid or gel and is optionally present in the negative electrode 22 and positive electrode 24. A first plurality of solid-state electrolyte particles, i.e., anolytes 90, may be incorporated into nucleation sites of the negative electrode 22, and a second plurality of solid-state electrolyte particles, i.e., catholytes 92, may be mixed with positive electroactive particles 60, which may be positive solid-state electroactive particles, present in the positive electrode 24 to form a continuous electrolyte network.

A negative electrode current collector 32 is located within the negative electrode 22 and is in electrical communication with the negative electrode 22. A positive electrode current collector 34 may be positioned at or near the positive electrode 24 and is in electrical communication with the positive electrode 24. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). Composite electrodes can also include an electrically conductive diluent, such as carbon black or carbon nanotubes, that is dispersed throughout the materials that define the positive electrode 24.

The battery 20 can generate an electric current (indicated by the block arrows) during discharge by way of reversible electrochemical reactions that occur when the external circuit 40 is closed (to connect the negative electrode 22 and the positive electrode 24) and when the negative electrode 22 contains a relatively greater quantity of lithium. The chemical potential difference between the negative electrode 22 and the positive electrode 24 drives electrons produced by the oxidation of inserted lithium at the negative electrode 22 through the external circuit 40 towards the positive electrode 24. Ions, which are also produced at the negative electrode 22, are concurrently transferred through the electrolyte and separator 30 towards the positive electrode 24. The electrons flow through the external circuit 40, and the ions migrate across the separator 30 to the positive electrode 24, where they may be plated, reacted, or intercalated. The electric current passing through the external circuit 40 can be harnessed and directed through the load device 42 (in the direction of the block arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and ions. The electrons, which flow back towards the negative electrode 22 through the external circuit 40, and the ions, which move across separator 30 back towards the negative electrode 22, reunite at the negative electrode 22 and replenish it with lithium for consumption during the next battery discharge cycle. As such, each discharge and charge event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators, which may require an AC:DC converter. In many of the configurations of the battery 20, each of the negative electrode current collector 32, the negative electrode 22, the separator 30, the positive electrode 24, and the positive electrode current collector 34 are prepared as relatively thin layers (for example, from several microns to a millimeter or less in thickness) and assembled in layers connected in electrical parallel arrangement to provide a suitable electrical energy and power package. In various other instances, the battery 20 may include electrodes 22, 24 connected in series.

Further, in certain aspects, the battery 20 may include a variety of other components that, while not depicted here, are nonetheless known to those of skill in the art. For instance, the battery 20 may include a casing, a gasket, terminal caps, and any other conventional components or materials that may be situated within the battery 20, including between or around the negative electrode 22, the positive electrode 24, and/or the separator 30, by way of non-limiting example. As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

The separator 30 is disposed between the negative electrode 22 and the positive electrode 24. The separator 30 operates as an electrical insulator by being sandwiched between the negative electrode 22 and the positive electrode 24 to prevent physical contact and the occurrence of a short circuit. The liquid electrolyte solution is present throughout the separator 30 and optionally in the negative electrode 22 as the anolyte 90 and/or in the positive electrode 24 as the catholyte 92. Therefore, in addition to providing a physical barrier between the electrodes 22, 24, the separator 30 acts like a sponge that contains the electrolyte solution in a network of open pores during the cycling of lithium ions to facilitate functioning of the battery 20. As discussed above, the chemical potential difference between the positive electrode 24 and the negative electrode 22 drives electrons produced by the oxidation of intercalated lithium at the negative electrode 22 through the external circuit 40 towards the positive electrode 24. Lithium ions, which are also produced at the negative electrode 22, are concurrently transferred through the liquid electrolyte solution contained in the separator 30 towards the positive electrode 24. The electrons flow through the external circuit 40 and the lithium ions migrate across the separator 30 containing the electrolyte solution to form intercalated lithium at the positive electrode 24.

The separator 30 operates as both an electrical insulator and a mechanical support. In some aspects, the separator 30 comprises a polyolefin, which may be microporous. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including that of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP).

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 30. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including that of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of polyethylene (PE) and polypropylene (PP), or multi-layered structured porous films of polyethylene (PE) and/or polypropylene (PP). The microporous polymer separator 30 may also comprise other polymers in addition to the polyolefin, such as, but not limited to, polyethylene terephthalate (PET), polyvinylidene fluoride (PVDF), and/or a polyamide. Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymer separator 30 as fibrous layers to help provide the microporous polymer separator 30 with appropriate structural and orosity characteristics. Various conventionally available polymers and commercial products for forming the separator 30 and the many manufacturing methods that may be employed to produce such microporous polymer separators 30 are contemplated.

When a polymer, the separator 30 may be mixed with a ceramic material or its surface may be coated in a ceramic material. For example, a ceramic coating may include ceramic oxides, such as alumina ($Al_2O_3$), silicon dioxide ($SiO_2$), titania ($TiO_2$), lithium lanthanum zirconium oxide (LLZO), lithium lanthanum titanium oxide (LLTO), lithium aluminum titanium phosphate (LATP), a lithium super ionic conductor (LISICON), lithium phosphorus oxynitride (LIPON), or combinations thereof. In various alternative embodiments, instead of a polymeric material as discussed above, the separator 30 comprises a green ceramic oxide (i.e., a ceramic oxide that has not been sintered or otherwise densified) having a high porosity of greater than or equal to about 10 vol. % to less than or equal to about 50 vol. %.

Any appropriate liquid electrolyte solution capable of conducting lithium ions between the negative electrode 22 and the positive electrode 24 may be used in the battery 20. In certain aspects, the electrolyte solution may be a nonaqueous liquid electrolyte solution including a lithium salt dissolved in an organic solvent or a mixture of organic solvents. Numerous conventional nonaqueous liquid electrolyte solutions may be employed in the battery 20. A non-limiting list of salts that may be dissolved in an organic solvent to form the nonaqueous liquid electrolyte solution includes lithium hexafluorophosphate (LiPF$_6$), lithium bis (fluorosulfonyl)imide (LiFSi), lithium bis(trifluoromethanesulfonyl)imide (LiTFSI), lithium tetrafluoroborate (LiBF$_4$), lithium bis(oxalato) borate (LiBOB), lithium oxalyldifluoroborate (LiODFB), lithium sulfonylbis(fluorosulfonyl) imide (Li SFSI), lithium carbonylbis(fluorosulfonyl)imide (LiCFSI), lithium perchlorate (LiClO$_4$), lithium tetrachloroaluminate (LiAlCl$_4$), lithium iodide (LiI), lithium bromide (LiBr), lithium thiocyanate (LiSCN), lithium tetraphenylborate (LiB(C$_6$H$_5$)$_4$), lithium hexafluoroarsenate (LiAsF$_6$), lithium trifluoromethanesulfonate (LiCF$_3$SO$_3$), lithium bis(trifluoromethanesulfonimide) (LiN(CF$_3$SO$_2$)$_2$), and combinations thereof. These and other similar salts may be dissolved in a variety of organic solvents, including, but not limited to, various alkyl carbonates, such as cyclic carbonates (propylene carbonate (PC), ethylene carbonate (EC), butylene carbonate (BC), fluorinated cyclic carbonate (fluoroethylene carbonate (FEC)), acyclic carbonates (dimethyl carbonate (DMC), diethyl carbonate (DEC), ethyl methyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, ethyl propyl ether (EPE), fluorinated linear carbonate (F-EMC), fluorinated ether (F-EPE)), cyclic ethers (tetrahydrofuran (THF), 2-methyltetrahydrofuran (2-Me THF)), and mixtures thereof.

Figure 2:
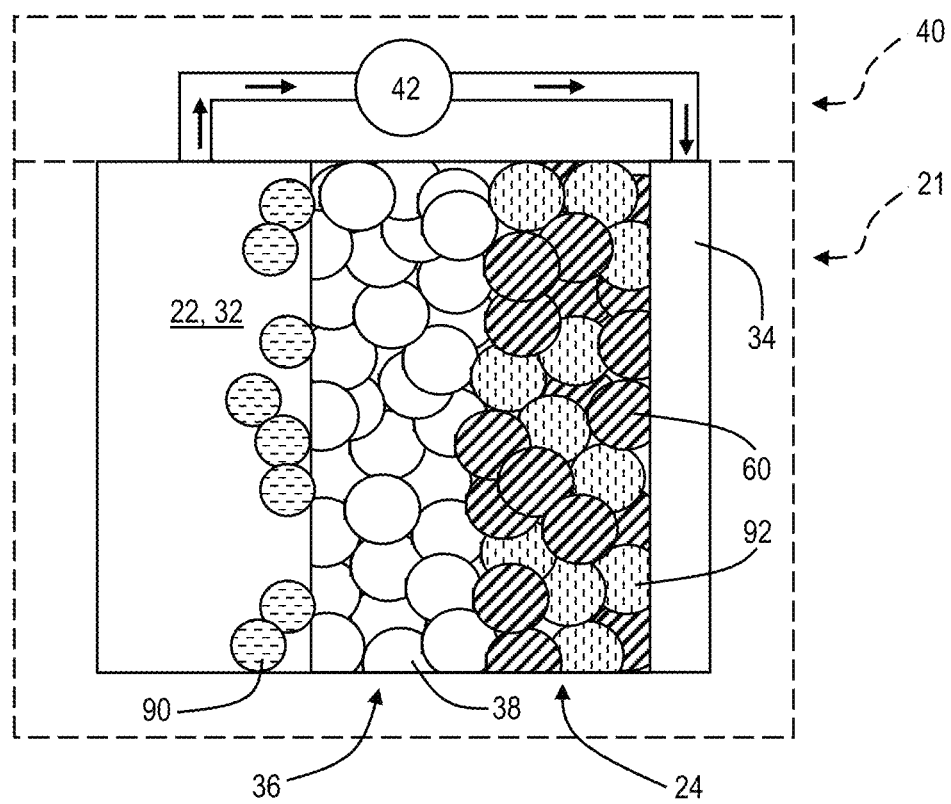
FIG. 2 is a schematic illustration of a lithium-ion battery in accordance with various aspects of the current technology.

With reference to FIG. 2, the current technology also considers a solid-state battery 21 that cycles lithium ions. The components of the solid-state battery 21 having equivalent corresponding components in the battery 20 of FIG. 1 are labeled with the same numerals. As such, the solid-state battery 21 comprises the negative electrode 22, the negative electrode current collector 32, the positive electrode 24, and the positive electrode current collector 34. However, the solid-state battery 21 does not include the porous separator 30 and the liquid electrolyte solution. Therefore, besides the above-description of the separator 30 and the liquid electrolyte solution, the description of the battery 20 applies equally to the solid-state battery 21.

Instead of a separator and liquid electrolyte solution, the solid-state battery 21 comprises a solid-state electrolyte 36 that provides electrical separation—preventing physical contact—between the negative electrode 22, i.e., the anode, and the positive electrode 24, i.e., the cathode. The solid-state electrolyte 36 also provides a minimal resistance path for the internal passage of ions. In various aspects, a first plurality of solid-state electrolyte particles 38 may define the solid-state electrolyte 36. For example, the solid-state electrolyte 36 may be in the form of a layer or a composite that comprises the first plurality of solid-state electrolyte particles 38. The solid-state electrolyte 36 may be in the form of a layer having a thickness of greater than or equal to about 1 μm to less than or equal to about 1 mm and, in certain aspects, optionally greater than or equal to about 1 μm to less than or equal to about 100 μm, by way of example. The solid-state battery 21 cycles lithium ions and electrons in the same manner as the battery 20 as discussed above; however, the lithium ions travel through the solid-state electrolyte 36 instead of the separator 30 and liquid electrolyte solution.

The solid-state electrolyte particles 38 may comprise one or more polymer-based particles, oxide-based particles, sulfide-based particles, halide-based particles, borate-based particles, nitride-based particles, and hydride-based particles. Such solid-state electrolyte particles 38 may be disposed in a plurality of layers so as to define a three-dimensional structure. In various aspects, the polymer-based particles may be intermingled with a lithium salt, like those described above, so as to act as a solid solvent. In certain variations, the polymer-based particles may comprise one or more polymer materials selected from the group consisting of polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene) (PVDF-HFP), polyvinyl chloride (PVC), and combinations thereof.

The oxide-based particles may comprise one or more garnet ceramics, LISICON-type oxides, and perovskite-type ceramics. For example, the one or more garnet ceramics may be selected from the group consisting of Li$_{6.5}$La$_3$Zr$_{1.75}$Te$_{0.25}$O$_{12}$, Li$_7$La$_3$Zr$_2$O$_{12}$, Li$_{6.2}$Ga$_{0.3}$La$_{2.95}$Rb$_{0.05}$Zr$_2$O$_{12}$, Li$_{6.85}$La$_{2.9}$Ca$_{0.1}$Zr$_{1.75}$Nb$_{0.25}$O$_{12}$, Li$_{6.25}$Al$_{0.25}$La$_3$Zr$_2$O$_{12}$, Li$_{6.75}$La$_3$Zr$_{1.75}$Nb$_{0.25}$O$_{12}$, Li$_{6.75}$La$_3$Zr$_{1.75}$Nb$_{0.25}$O$_{12}$, and combinations thereof. The one or more LISICON-type oxides may be selected from the group consisting of Li$_{14}$Zn (GeO$_4$)$_4$, Li$_{3+x}$(P$_{1-x}$Si$_x$)O$_4$ (where 0<x<1), L$_{3+x}$Ge$_x$V$_{1-x}$O$_4$ (where 0<x<1), and combinations thereof. The one or more perovskite-type ceramics may be selected from the group consisting of Li$_{3.3}$La$_{0.53}$TiO$_3$, LiSr$_{1.65}$Zr$_{1.3}$Ta$_{1.7}$O$_9$, Li$_{2x-y}$Sr$_{1-x}$Ta$_y$Zr$_{1-y}$O$_3$ (where x=0.75y and 0.60<y<0.75), Li$_{3/8}$Sr$_{7/16}$Nb$_{3/4}$Zr$_{1/4}$O$_3$, Li$_{3x}$La$_{(2/3-x)}$TiO$_3$ (where 0<x<0.25), and combinations thereof.

The sulfide-based particles may include one or more sulfide-based materials selected from the group consisting of Li$_2$S—P$_2$S$_5$, Li$_2$S—P$_2$S$_5$-MS$_x$ (where M is Si, Ge, and Sn and 0≤x≤2), Li$_{3.4}$Si$_{0.4}$P$_{0.6}$S$_4$, Li$_{10}$GeP$_2$S$_{11.7}$O$_{0.3}$, Li$_{9.6}$P$_3$S$_{12}$, Li$_7$P$_3$S$_{11}$, Li$_9$P$_3$S$_9$O$_3$, Li$_{10.35}$Si$_{1.35}$P$_{1.65}$S$_{12}$, Li$_{9.81}$Sn$_{0.81}$P$_{2.19}$S$_{12}$, Li$_{10}$(Si$_{0.5}$Ge$_{0.5}$)P$_2$S$_{12}$, Li(Ge$_{0.5}$Sn$_{0.5}$)P$_2$S$_{12}$, Li(Si$_{0.5}$Sn$_{0.5}$)P$_s$S$_{12}$, Li$_{10}$GeP$_2$S$_{12}$ (LGPS), Li$_6$PS$_5$X (where X is Cl, Br, or I), Li$_7$P$_2$S$_8$I, Li$_{10.35}$Ge$_{1.35}$P$_{1.65}$S$_{12}$, Li$_{3.25}$Ge$_{0.25}$P$_{0.75}$S$_4$, Li$_{10}$SnP$_2$S$_{12}$, Li$_{10}$SiP$_2$S$_{12}$, Li$_{9.54}$Si$_{1.74}$P$_{1.44}$S$_{11.7}$Cl$_{0.3}$, (1−x)P$_2$S$_5$-xLi$_2$S (where 0.5≤x≤0.7), and combinations thereof.

The halide-based particles may include one or more halide-based materials selected from the group consisting of Li$_2$CdCl$_4$, Li$_2$MgCl$_4$, Li$_2$CdI$_4$, Li$_2$ZnI$_4$, Li$_3$OCl, LiI, Li$_5$ZnI$_4$, Li$_3$OCl$_{1-x}$Br$_x$ (where 0<x<1), and combinations thereof.

The borate-based particles may include one or more borate-based materials selected from the group consisting of Li$_2$B$_4$O$_7$, Li$_2$O—(B$_2$O$_3$)—(P$_2$O$_5$), and combinations thereof. In one variation, the one or more borate-based materials may have an ionic conductivity greater than or equal to about $10^{-7}$ S/cm to less than or equal to about $10^{-6}$ S/cm.

The nitride-based particles may include one or more nitride-based materials selected from the group consisting of Li$_3$N, Li$_7$PN$_4$, LiSi$_2$N$_3$, LiPON, and combinations thereof. In one variation, the one or more nitride-based materials may have an ionic conductivity greater than or equal to about $10^{-9}$ S/cm to less than or equal to about $10^{-3}$ S/cm.

The hydride-based particles may include one or more hydride-based materials selected from the group consisting of Li$_3$AlH$_6$, LiBH$_4$, LiBH$_4$—LiX (where X is one of Cl, Br, and I), $LiNH_2$, $Li_2NH$, $LiBH_4$—$LiNH_2$, and combinations thereof. In one variation, the one or more hydride-based materials may have an ionic conductivity greater than or equal to about $10^{-7}$ S/cm to less than or equal to about $10^{-4}$ S/cm.

The following description is made with further reference to FIG. 1 unless otherwise specified. However, it is understood that the following description applies equally to the solid-state battery shown in FIG. 2.

The positive electrode 24 may be formed from a lithium-based or electroactive material that can undergo lithium intercalation and deintercalation while functioning as the positive terminal of the battery 20. For example, in certain variations, the positive electrode 24 may be defined by the plurality of the positive electroactive particles 60. In certain instances, as illustrated, the positive electrode 24 is a composite comprising a mixture of the positive electroactive particles 60 and the catholyte 92, e.g., catholyte particles. For example, the positive electrode 24 may include greater than or equal to about 10 wt. % to less than or equal to about 95 wt. % and, in certain aspects, optionally greater than or equal to about 50 wt. % to less than or equal to about 90 wt. %, of the positive electroactive particles 60 and greater than or equal to about 5 wt. % to less than or equal to about 70 wt. % and, in certain aspects, optionally greater than or equal to about 10 wt. % to less than or equal to about 30 wt. %, of the catholyte 92. In various instances, the catholyte 92 may be the same as or different from the anolyte 90 or solid-state electrolyte particles 38.

In various aspects, the positive electrode 24 may be one of a layered-oxide cathode, a spinel cathode, and a polyanion cathode. For example, in the instances of a layered-oxide cathode (e.g., rock salt layered oxides), the positive electroactive particles 60 may comprise one or more positive electroactive materials selected from $LiCoO_2$, $LiNi_xM-n_yCo_{1-x-y}O_2$ (where $0 \leq x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$) for lithium-ion batteries. The spinel cathode may include one or more positive electroactive materials, such as $LiMn_2O_4$ and $LiNi_xMn_{1.5}O_4$. The polyanion cathode may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$, and/or a silicate, such as $LiFeSiO_4$, for lithium-ion batteries. In this fashion, in various aspects, the positive electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive electroactive particles 60 may be coated (for example, by $Al_2O_3$) and/or the positive electroactive material may be doped (for example, by magnesium).

In certain variations, the positive electroactive particles 60 may be optionally intermingled with one or more electrically conductive materials that provide an electron conduction path and/or with at least one polymeric binder material that improves the structural integrity of the positive electrode 24. For example, the positive electroactive particles 60 may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like.

In certain aspects, mixtures of the conductive materials may be used. For example, the positive electrode 24 may include greater than or equal to about 0 wt. % to less than or equal to about 25 wt. %, optionally greater than or equal to about 0 wt. % to less than or equal to about 10 wt. %, and, in certain aspects, optionally greater than or equal to about 0 wt. % to less than or equal to about 5 wt. % of the one or more electrically conductive additives and greater than or equal to about 0 wt. % to less than or equal to about 20 wt. %, optionally greater than or equal to about 0 wt. % to less than or equal to about 10 wt. %, and, in certain aspects, optionally greater than or equal to about 0 wt. % to less than or equal to about 5 wt. % of the one or more binders. The positive electrode current collector 34 may be formed from aluminum or any other electrically conductive material known to those of skill in the art.

Figure 3:
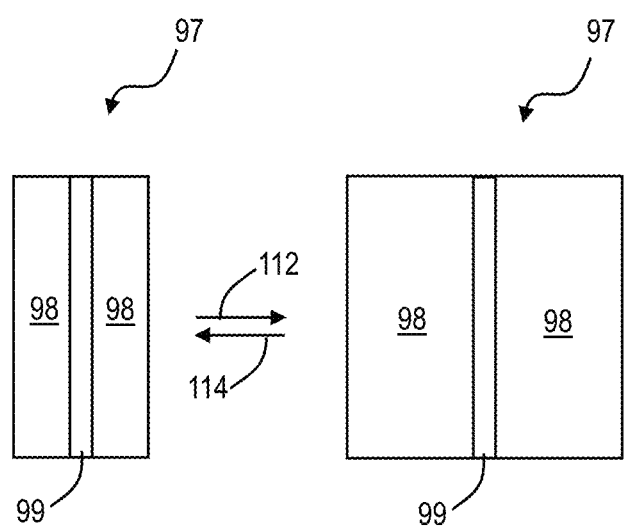
FIG. 3 is a schematic illustration showing a comparative electrode undergoing volume changes during cycling.

In accordance with the current technology, the negative electrode (or anode) 22 comprises a carbon material or a carbon membrane having a first face and an opposing second face and defining a carbon matrix. As used herein, a "matrix" is a bulk composition defined by an intermingled web of carbon molecules, particles, or structures. As non-limiting examples, the carbon material or membrane comprises carbon nanotubes, carbon nanofibers, carbon paper, graphene paper, or combinations thereof. At least a portion of the carbon material or membrane is modified to include an elevated number of nucleation sites for lithium relative to the carbon matrix when unmodified. The negative electrode 22 exhibits a state of charge (SOC) of greater than or equal to about 70%, greater than or equal to about 75%, or greater than or equal to about 80% after 15 minutes (i.e., in fewer than 16 minutes) of charging. The negative electrode 22 also exhibits a volume change of less than or equal to about 20%, less than or equal to about 15%, less than or equal to about 10%, less than or equal to about 5%, or less than or equal to about 2% during lithium plating and stripping cycles. For example, FIG. 3 shows a comparative electrode 97 having lithium 98 disposed on opposing faces of a current collector 99. As the comparative electrode 97 undergoes plating 112 and stripping 114, the comparative electrode 97 undergoes large volume changes that can lead to dendrite growth, poor efficiencies, and a short lifetime. In contrast, the negative electrode 22 of the current technology does not exhibit such large volume changes during cycling. Various aspects of the negative electrode 22 are further described below with reference to FIGS. 4-7. Although the negative electrode 22 has certain advantages when employed as a negative electrode, i.e., an anode, it is understood that it additionally, or alternatively, may be coated with a positive electroactive composition and be employed as a cathode.

Figure 4:
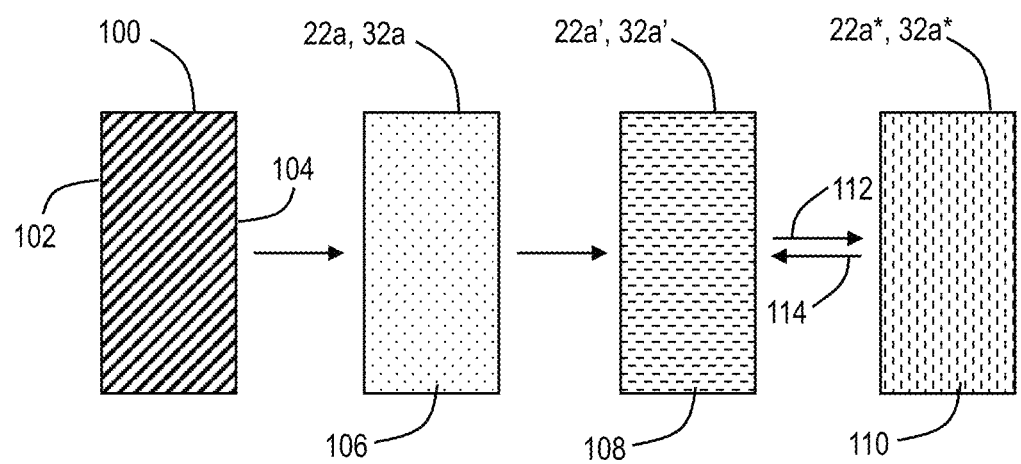
FIG. 4 shows schematic illustrations of a cross section of a first electrode in accordance with various aspects of the current technology.

In FIG. 4, an electrode 22a is prepared by obtaining a carbon material 100 having a first face 102 and an opposing second face 104, the carbon material 100 having been described above (i.e., including carbon nanotubes, carbon nanofibers, carbon paper, graphene paper, or combinations thereof), and modifying all or substantially of the carbon material 100. The carbon material 100 has a thickness of greater than or equal to about 10 µm to less than or equal to about 100 µm and a porosity of greater than or equal to about 30% to less than or equal to about 90%, where "porosity" is defined as a fraction of the total volume of pores over the total volume of the carbon material 100.

The modifying induces defects into the surface of the carbon material 100 or throughout the carbon material 100 and is performed by laser ablation, contact with oxygen plasma, or wet chemistry oxidation. As such, the carbon material 100 may be physically and/or chemically modified. Modifying by laser ablation includes, for example, scanning the carbon material 100 with a laser having a wavelength of greater than or equal to about 800 nm to less than or equal to about 1200 nm, e.g., 1070 nm, and a power of greater than or equal to about 200 W to less than or equal to about 500 W, e.g., 400 W, while employing a scanning speed of greater than or equal to about 0.5 m/s to less than or equal to about 5 m/s, e.g., 1.5 m/s, and a scanning overlap of greater than or equal to about 20% to less than or equal to about 90%, e.g., 50%. The scanning with the laser induces defects into the carbon material 100 and generates the electrode 22a. Modifying by oxygen plasma includes, for example, introducing a gas into a chamber containing the carbon material 100, the chamber exhibiting a negative pressure, i.e., a vacuum chamber. The gas comprises greater than or equal to about 0% to less than or equal to about 99% argon (Ar) and a balance of oxygen ($O_2$). The modifying then includes contacting the gas with a direct current (DC), radio frequency (RF), or microwave power, ionizing the oxygen ($O_2$), and contacting the carbon material 100 with the ionized oxygen, wherein the ionized oxygen reacts with carbon in the carbon material 100, forms carbon dioxide ($CO_2$), and induces defects in the carbon material 100 to form the electrode 22a. Including argon in the gas can increase this etching effect and results in a higher level of defects on the carbon material 100 to form the electrode 22a. Modifying by wet chemistry oxidation includes, for example, contacting the carbon material 100 with a strong acid which etches the carbon material 100, thereby introducing defects and forming the electrode 22a. The strong acid can be $HNO_3$, $H_2SO_4$, HCl, HF, and combinations thereof, as non-limiting examples.

After the all or substantially all of the carbon material 100 is modified, the electrode 22a is formed, which includes a modified carbon material 106. By "substantially all," it is meant that a portion, such as less than or equal to about 20%, less than or equal to about 10%, or less than or equal to about 5% of the electrode volume may be unintentionally unmodified. Therefore, the electrode 22a comprises, consists essentially of, or consists of the modified carbon material 106, where "consists essentially of the modified carbon material 106" means that the electrode 22a may only also include unavoidable impurities, such as at concentrations of less than or equal to about 5 wt. % based on the total weight of the electrode 22a (with the proviso that it may also include lithium and optionally a solid-state electrolyte particle at the nucleation sites, as discussed below). In certain aspects, the electrode 22a is substantially free of molecules covalently bonded to the modified carbon material 106, where "substantially free" means that only unintended and unavoidable impurities may be covalently bonded to the modified carbon material 106. The carbon material 100 is substantially flat and does not provide a sufficient number of nucleation sites for lithium so that large volume changes during cycling can be avoided. In contrast, the modified carbon material 106 has a complex three-dimensional microstructure and relatively more nucleation sites. As such, the modified carbon material 106 has an elevated number of nucleation sites relative to the carbon material 100. Moreover, the electrode 22a is a host for lithium ions, optionally an electrolyte, such as the anolyte 90 shown in FIGS. 1-2, and a current collector 32a.

The electrode 22a is further processed by incorporating lithium into the modified carbon material 106 to form a lithium-modified electrode 22a' comprising a lithium-filled modified carbon material 108, which also serves as a lithium-modified current collector 32a'. The incorporating is performed by vacuum infiltration at a high temperature (such as at a temperature above the melting point of lithium metal), electrochemical plating, thermal evaporation, lithium foil lamination, and combinations thereof, as non-limiting examples. The electrochemical plating includes disposing the electrode 22a within an electrolyte including lithium (i.e., as a counter electrode) and applying an electric current. The thermal evaporation includes heating a solid lithium source, such as lithium metal, within a vacuum chamber containing the electrode 22a to induce the formation of a lithium vapor, which coats the electrode 22a. The lithium foil lamination includes disposing a lithium foil onto at least one face of the electrode 22a.

The lithium-modified electrode 22a' resists substantial volume changes during cycling. For example, during plating 112, lithium is plated onto the lithium-modified electrode 22a' to generate a lithium-plated electrode 22a*, which also serves as a lithium-plated current collector 32a* having a lithium-plated modified carbon material 110. During stripping 114, the lithium-plated electrode 22a* returns to the form of the lithium-modified electrode 22a'. Especially in comparison to the comparative electrode 97 of FIG. 3, no substantial volume changes occur during the plating 112 and stripping 114 of the lithium-modified electrode 22a' and the lithium-plated electrode 22a*, respectively.

Figure 5:
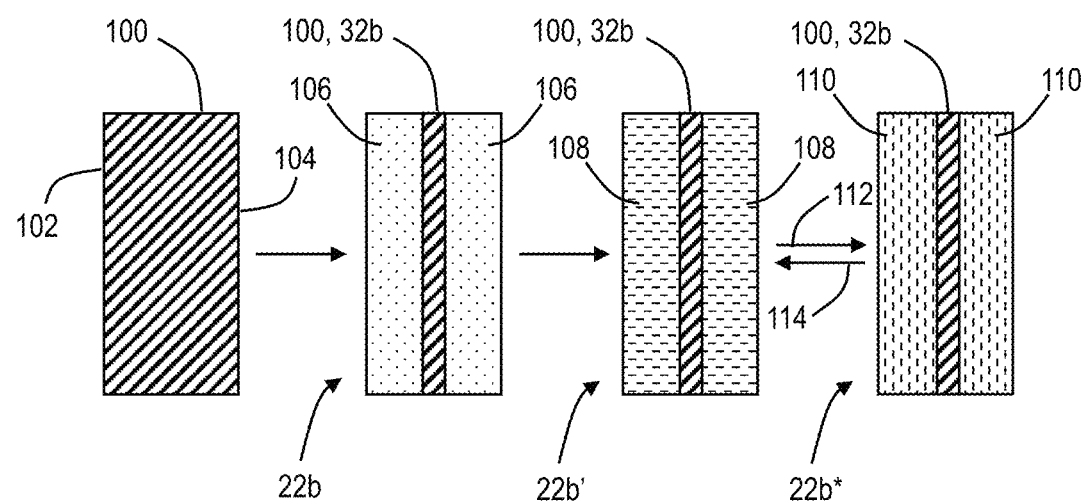
FIG. 5 shows schematic illustrations of a cross section of a second electrode in accordance with various aspects of the current technology.

In FIG. 5, an electrode 22b is prepared by obtaining the carbon material 100 having the first face 102 and the opposing second face 104, the carbon material 100 having been described above (i.e., including carbon nanotubes, carbon nanofibers, carbon paper, graphene paper, or combinations thereof), and modifying at least one of the first face 102 or the second face 104 of the carbon material 100.

The modifying is performed by the same methods described above with reference to the electrode 22a of FIG. 4, but, for example, for a shorter period of time and/or with a laser with lower power (i.e., when performing laser ablation). As such, the carbon material 100 may be physically modified. As a result of the modifying, at least one of the first face 102 or the second face 104 of the electrode 22b comprises the modified carbon material 106 (with both faces 102, 104 being modified in the figure) and at least a center portion of the electrode 22b is not modified and defines a current collector 32b. Therefore, the electrode 22b comprises, consists essentially of, or consists of the modified carbon material 106 and the unmodified carbon material 100 defining the current collector 32b, where "consists essentially of" means that the electrode 22b may only also include unavoidable impurities, such as at concentrations of less than or equal to about 5 wt. % based on the total weight of the electrode 22b (with the proviso that it may also include lithium and optionally a solid-state electrolyte particle at the nucleation sites, as discussed below). In certain aspects, the electrode 22b is substantially free of molecules covalently bonded to the modified carbon material 106. The modified carbon material 106 has an elevated number of nucleation sites relative to the carbon material 100. Moreover, the electrode 22b is a host for lithium ions and optionally an electrolyte, such as the anolyte 90 shown in FIGS. 1-2.

The electrode 22b is further processed by incorporating lithium into the modified carbon material 106 to form a lithium-modified electrode 22b' comprising a lithium-filled modified carbon material 108 by the same methods discussed above with reference to the electrode 22a of FIG. 4. The lithium-modified electrode 22b' also resists substantial volume changes during cycling. For example, during plating 112, lithium is plated onto the lithium-modified electrode 22b' to generate a lithium-plated electrode 22b* having a lithium-plated modified carbon material 110. During stripping 114, the lithium-plated electrode 22b* returns to the form of the lithium-modified electrode 22b'. Especially in comparison to the comparative electrode 97 of FIG. 3, no substantial volume changes occur during the plating 112 and stripping 114 of the lithium-modified electrode 22b' and the lithium-plated electrode 22b*, respectively.

Figure 6:
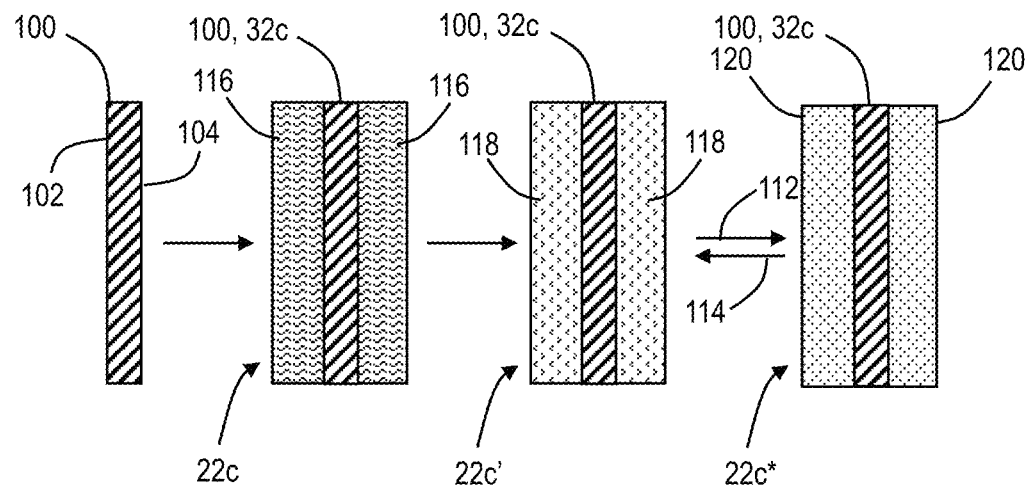
FIG. 6 shows schematic illustrations of a cross section of a third electrode in accordance with various aspects of the current technology.

In FIG. 6, an electrode 22c is prepared by obtaining the carbon material 100 having the first face 102 and the opposing second face 104, the carbon material 100 having been described above (i.e., including carbon nanotubes, carbon nanofibers, carbon paper, graphene paper, or combinations thereof), and modifying at least one of the first face 102 or the second face 104 by disposing a layer comprising a lithophilic material onto at least one of the first face 102 or the second face 104 to define a modified carbon material 116, i.e., modified with the lithophilic layer. As non-limiting examples, the lithophilic material comprises silver (Ag), gold (Au), aluminum (Al), tin (Sn), silicon (Si), and combinations thereof. The disposing is performed by electrochemical plating or vapor deposition, e.g., physical vapor deposition (PVD), chemical vapor deposition (CVD), or atomic layer deposition (ALD). An unmodified portion of the carbon material 100 defines a current collector 32c. The modified carbon material 116, i.e., the lithophilic layer, has an elevated number of nucleation sites relative to the carbon material 100. Moreover, the electrode 22c is a host for lithium ions and optionally an electrolyte, such as the anolyte 90 shown in FIGS. 1-2.

The electrode 22c is further processed by incorporating lithium into the modified carbon material 116 to form a lithium-modified electrode 22c' comprising a lithium-filled modified carbon material 118 (i.e., a lithium-filled lithophilic layer) by the same methods discussed above with reference to the electrode 22a of FIG. 4. The lithium-modified electrode 22c' also resists substantial volume changes during cycling. For example, during plating 112, lithium is plated onto the lithium-modified electrode 22c' to generate a lithium-plated electrode 22c* having a lithium-plated modified carbon material 120. During stripping 114, the lithium-plated electrode 22c* returns to the form of the lithium-modified electrode 22c'. Especially in comparison to the comparative electrode 97 of FIG. 3, no substantial volume changes occur during the plating 112 and stripping 114 of the lithium-modified electrode 22c' and the lithium-plated electrode 22c*, respectively.

Figure 7:
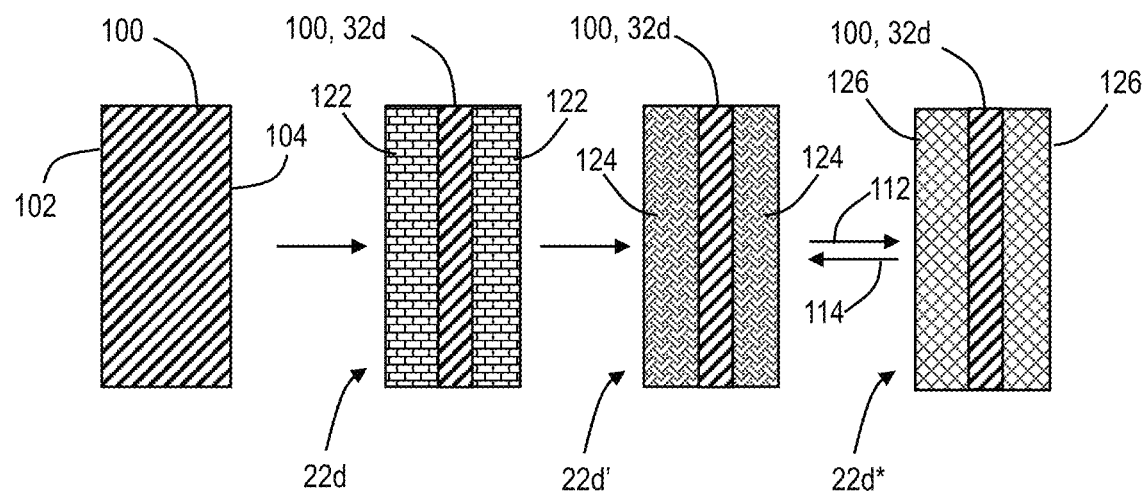
FIG. 7 shows schematic illustrations of a cross section of a fourth electrode in accordance with various aspects of the current technology.

In FIG. 7, an electrode 22d is prepared by obtaining the carbon material 100 having the first face 102 and the opposing second face 104, the carbon material 100 having been described above (i.e., including carbon nanotubes, carbon nanofibers, carbon paper, graphene paper, or combinations thereof), and modifying at least one of the first face 102 or the second face 104 by doping at least one of the first face 102 or the second face 104 with nitrogen (N), sulfur (S), phosphorous (P), boron (B), or combinations thereof to define a modified carbon material 122, i.e., a doped-carbon material. The nitrogen (N) doping may be performed by contacting the carbon material 100 with nitrogen plasma, the sulfur (S) doping may be performed by heat treating the carbon material 100 with phenyl disulfide, the phosphorous (P) doping may be performed by heat treating the carbon material 100 with pentaphenylphosphole oxide, and the boron (B) doping may be performed by heat treating the carbon material 100 with boric acid in an inert atmosphere including, for example, argon or nitrogen gas. The heat treating steps described with regard to the doping are performed at a temperature of greater than or equal to about 500° C. The dopants make the first face 102 and/or the second face 104 more lithophilic relative to the carbon material 100 when unmodified. An unmodified portion of the carbon material 100 defines a current collector 32d. The modified carbon material 122, i.e., the doped-carbon material, has an elevated number of nucleation sites relative to the carbon material 100. Moreover, the electrode 22d is a host for lithium ions and optionally an electrolyte, such as the anolyte 90 shown in FIGS. 1-2.

The electrode 22d is further processed by incorporating lithium into the modified carbon material 122 to form a lithium-modified electrode 22d' comprising a lithium-filled modified carbon material 124 (i.e., a lithium-filled doped-carbon material) by the same methods discussed above with reference to the electrode 22a of FIG. 4. The lithium-modified electrode 22d' also resists substantial volume changes during cycling. For example, during plating 112, lithium is plated onto the lithium-modified electrode 22d' to generate a lithium-plated electrode 22d* having a lithium-plated modified carbon material 126. During stripping 114, the lithium-plated electrode 22d* returns to the form of the lithium-modified electrode 22d'. Especially in comparison to the comparative electrode 97 of FIG. 3, no substantial volume changes occur during the plating 112 and stripping 114 of the lithium-modified electrode 22d' and the lithium-plated electrode 22d*, respectively.

Embodiments of the present technology are further illustrated through the following non-limiting example.

Example

A carbon membrane including carbon nanotubes and carbon nanofibers is obtained and imaged by electron microscopy. Surfaces of the carbon membrane are shown in the micrographs of FIGS. 8A-8B, with differing magnifications. These micrographs show a substantially flat and two-dimensional surface. FIG. 8C shows a micrograph of a cross section of the carbon membrane, which also shows a substantially flat and two-dimensional surface.

The carbon membrane is modified by laser ablation using a laser having a wavelength of 1070 nm and a power of 400 W while employing a scanning speed of 1.5 m/s and a scanning overlap of 50%. FIG. 9 shows a micrograph of a surface of the modified carbon membrane. Especially when compared to the surface of the unmodified carbon membrane (see FIGS. 8A-8B), this micrograph shows the surface as having depth (seen by the clear and blurry portions of the surface), which thus indicates that the surface is three-dimensional and has a higher surface area relative to the unmodified carbon membrane. Lithium is inserted into the modified carbon membrane by electrochemical plating to result in a modified carbon membrane electrode. The modified carbon membrane electrode is analyzed with reference to a lithium foil electrode and an unmodified carbon membrane electrode containing lithium.

Figure 10:
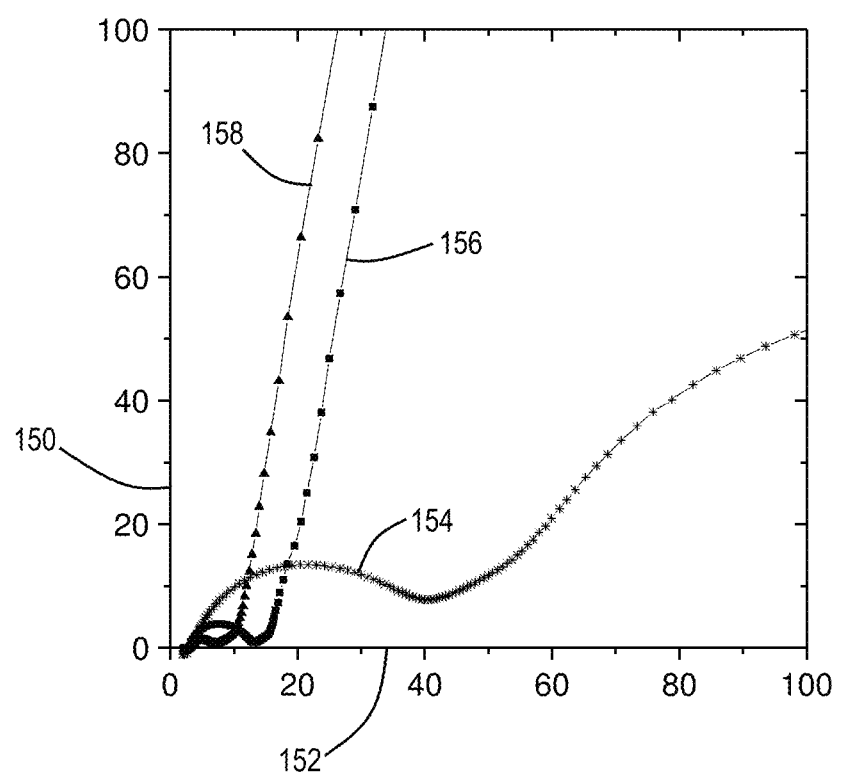
FIG. 10 is a Nyquist plot showing the impedance of an exemplary electrode prepared in accordance with various aspects of the current technology.

FIG. 10 is a Nyquist plot obtained from electrochemical impedance spectroscopy (EIS). The Nyquist plot has a y-axis 150 representing an imaginary part of the impedance (−Im(Z)/Ohm) and an x-axis 152 representing a real part of the impedance (Re(Z)/Ohm). The Nyquist plot includes a first curve 154 representing the lithium foil electrode, a second curve 156 representing the unmodified carbon membrane electrode, and a third curve 158 representing the modified carbon membrane electrode. The Nyquist plot shows that the relatively higher surface area of the modified carbon membrane electrode provides a lower impedance than both of the lithium foil electrode and the unmodified carbon membrane electrode, which have relatively lower surface areas. The high surface area of the modified carbon membrane electrode facilitates lithium plating and stripping, which is indicated by the lower impedance.

Figure 11:
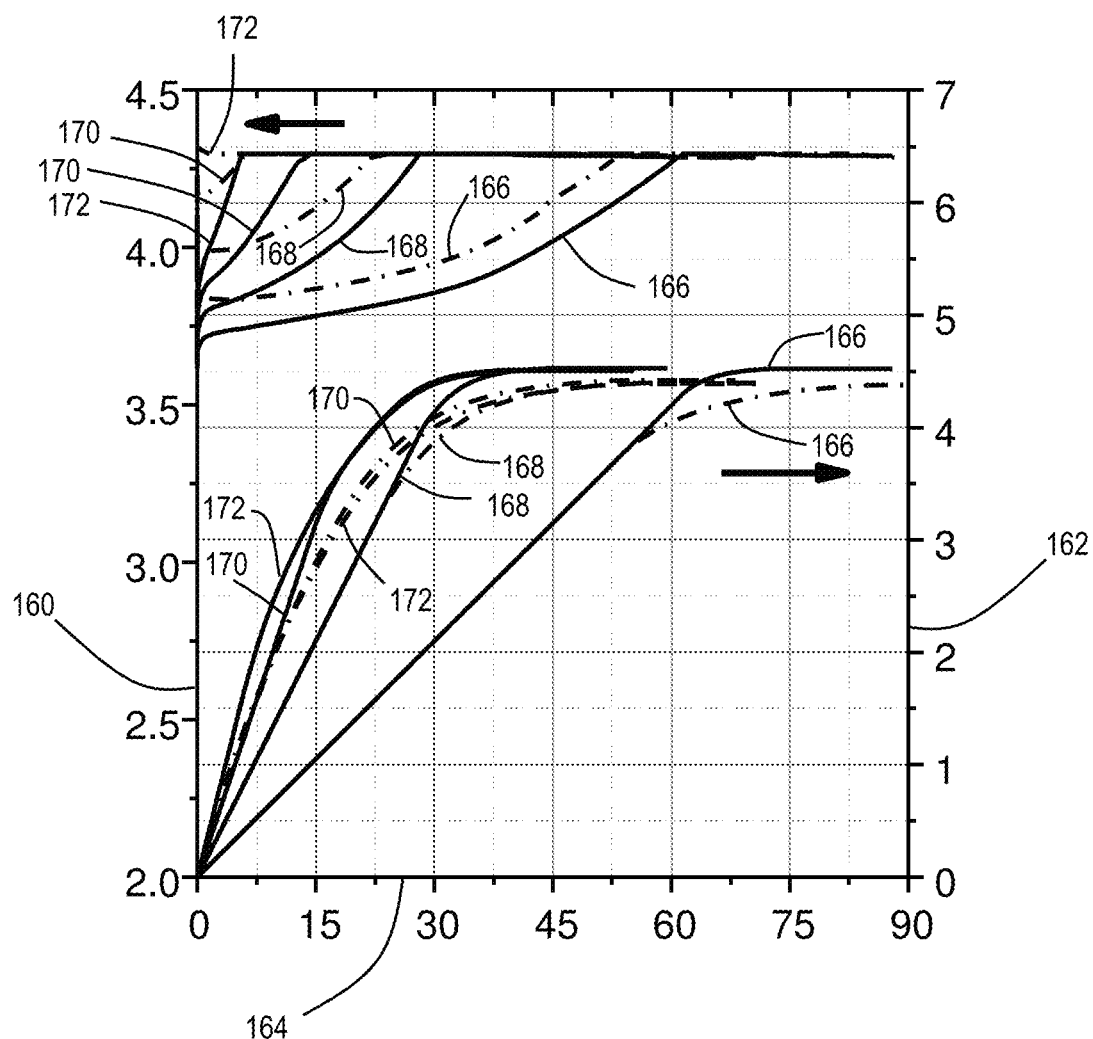
FIG. 11 is a graph showing the state of charge (SOC) of an electrode including unmodified carbon nanotubes and carbon nanofibers. The solid curves correspond to a lithium-metal electrode control, and the dashed curves correspond to the unmodified electrode.

Charging times of the unmodified carbon membrane electrode and the lithium foil electrode are analyzed and the data plotted in the graph shown in FIG. 11. The graph has a first y-axis 160 representing cell voltage (volts), a second y-axis 162 representing charge capacity (mAh/cm$^2$), and an x-axis 164 representing charging time (minutes). Dashed curves represent the lithium foil electrode and solid curves represent the unmodified carbon membrane electrode. Curves for one cycle 166, curves for two cycles 168, curves for three cycles 170, and curves for four cycles 172 are shown. This graph shows that the unmodified carbon membrane electrode has a faster charging time relative to the lithium foil electrode.

Figure 12:
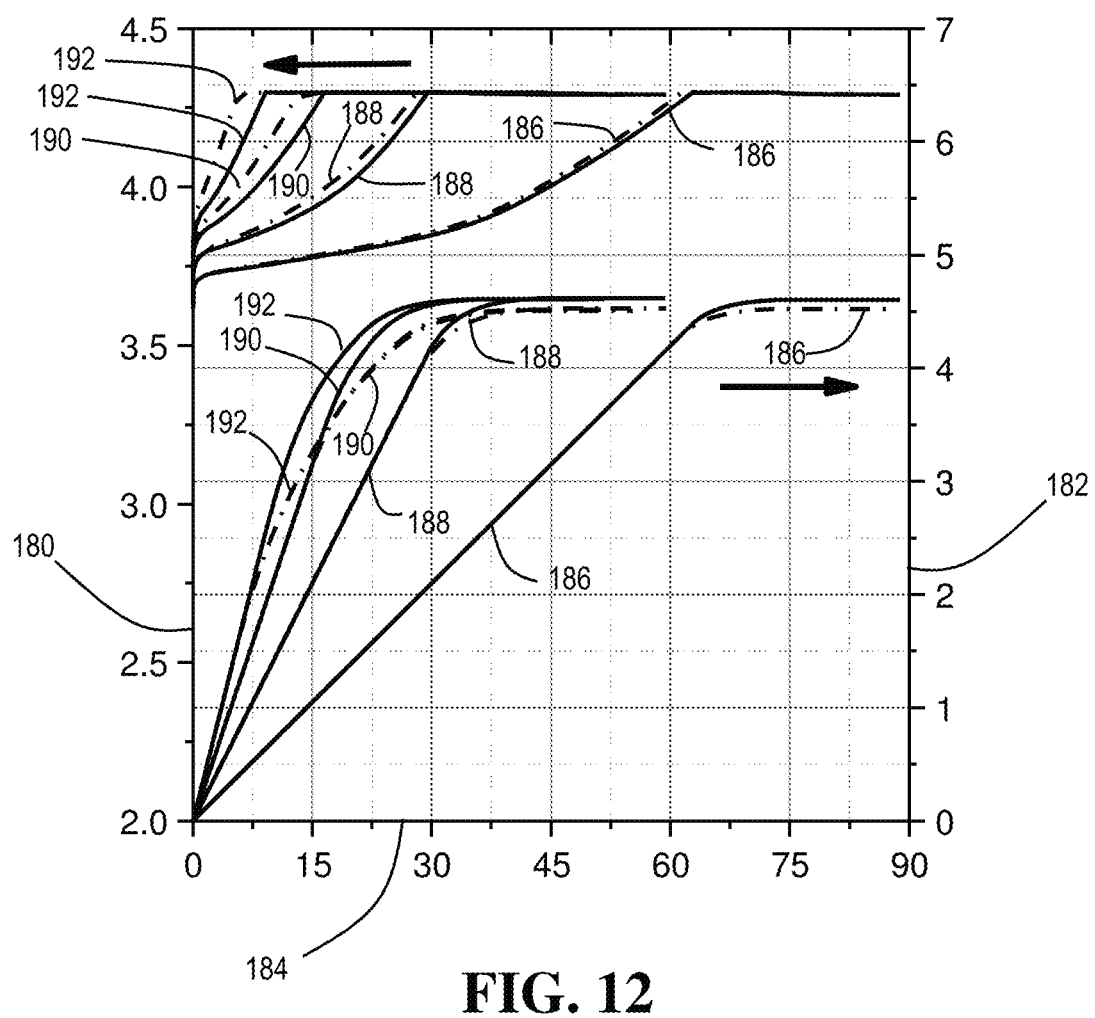
FIG. 12 is a graph showing the state of charge (SOC) of an exemplary electrode including modified carbon nanotubes and carbon nanofibers in accordance with various aspects of the current technology. The solid curves correspond to a lithium-metal electrode control, and the dashed curves correspond to the modified electrode.

Charging times of the modified carbon membrane electrode and the unmodified carbon membrane electrode are analyzed and the data plotted in the graph shown in FIG. 12. The graph has a first y-axis 180 representing cell voltage (volts), a second y-axis 182 representing charge capacity (mAh/cm$^2$), and an x-axis 184 representing charging time (minutes). Dashed curves represent the unmodified carbon membrane electrode and solid curves represent the modified carbon membrane electrode. Curves for one cycle 186, curves for two cycles 188, curves for three cycles 190, and curves for four cycles 192 are shown. This graph shows that the modified carbon membrane electrode has a faster charging time relative to the unmodified carbon membrane electrode. The modified carbon membrane electrode exhibits greater than 80% state of charge (SOC) in 15 minutes.

Figure 13:
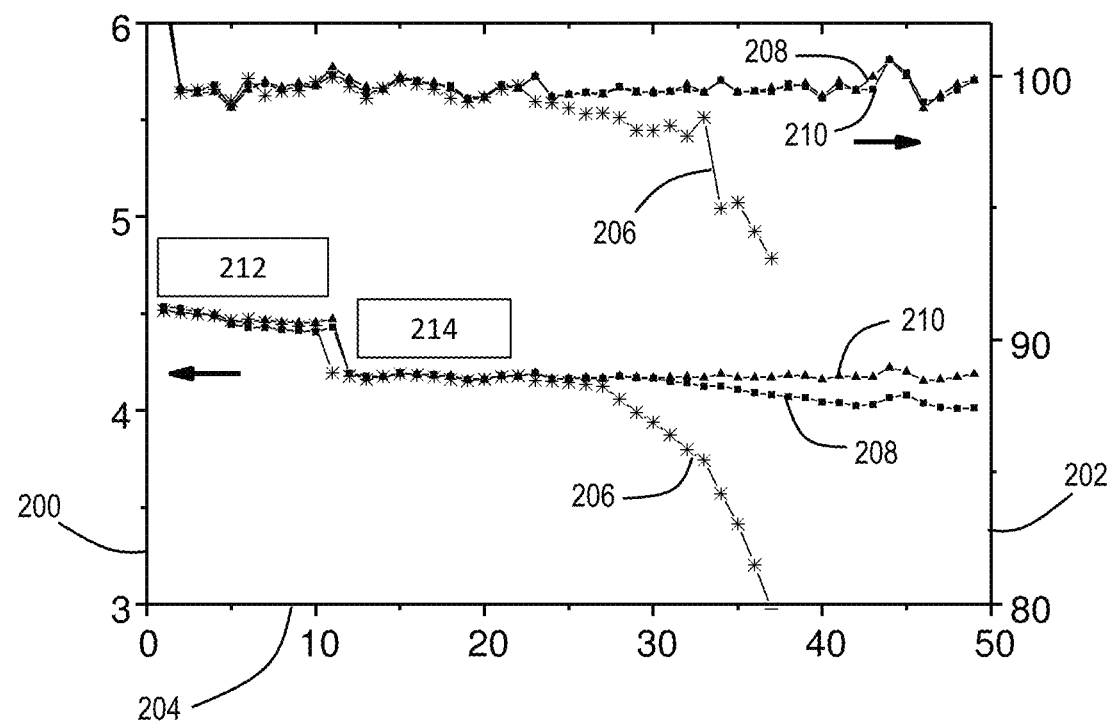
FIG. 13 is a graph showing the stability of an exemplary electrode including modified carbon nanotubes and carbon nanofibers in accordance with various aspects of the current technology.

An accelerating test is also performed to compare the long-term cycle stability of the electrodes at the fast charging rate. Cycles are tested at 1.67 C for charge and discharge. The resulting graph is shown in FIG. 13. The graph has a first y-axis 200 representing discharge capacity (mAh/cm$^2$), a second y-axis 202 representing coulombic efficiency ("CE"; %), and an x-axis 204 representing cycle number. First curves 206 represent the lithium foil electrode, second curves 208 represent the unmodified carbon membrane electrode, and third curves 210 represent the modified carbon membrane electrode. An area showing 100% state of charge (SOC) 212 and an area showing 80% state of charge (SOC) 214 are provided in the graph. The graph shows that the unmodified carbon membrane electrode provides better long-term cycle stability relative to the lithium foil electrode. However, the modified carbon membrane electrode provides better long-term cycle stability relative to the unmodified carbon membrane electrode, which is due to uniform plating and stripping (higher surface areas lead to lower local current densities).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode for an electrochemical cell, the electrode comprising:
   a single layered carbon membrane having a first face and an opposing second face, the carbon membrane comprising greater than or equal to 95% carbon,
   wherein a first portion of the carbon membrane extending between the first face and the opposing second face is modified such that the first portion of the carbon membrane extending between the first face and the opposing second face includes an elevated number of nucleation sites for lithium relative to a second portion of the carbon membrane extending between the first face and the opposing second face that is unmodified, wherein the first portion of the carbon membrane that is modified defines the electrode and the second portion of the carbon membrane that is unmodified defines a current collector.

2. The electrode according to claim 1, wherein the carbon membrane comprises carbon nanotubes, carbon nanofibers, carbon paper, graphene paper, or combinations thereof.

3. The electrode according to claim 1, wherein the first portion of the carbon membrane comprises greater than or equal to about 80% of the volume of the carbon membrane extending between the first face and the opposing second face.

4. The electrode according to claim 1, wherein the carbon membrane is substantially free of molecules covalently bonded to the carbon membrane.

5. The electrode according to claim 1, wherein the carbon membrane comprises a first surface portion extending along the first face and between the first face and the opposing second face, a second surface portion extending along the opposing second face and between the first face and the opposing second face, and a center portion extending between the first surface portion and the second surface portion and between the first face and the opposing second face, wherein the first portion of the carbon membrane comprises the first surface portion and the second surface portion, and the second portion of the carbon membrane comprises the center portion.

6. The electrode according to claim 5, further comprising lithium, wherein the lithium is incorporated into at least one of the first surface portion or the second surface portion of the carbon membrane.

7. The electrode according to claim 1, wherein the elevated number of nucleation sites for lithium are defined by defects in the first portion, and wherein the first portion of the carbon membrane extending between the first face and the opposing second face is modified by laser ablation, contact with oxygen plasma, wet chemistry oxidation, or a combination thereof.

8. The electrode according to claim 1, wherein the carbon membrane has a thickness defined between the first face and the opposing second face of greater than or equal to about 10 micrometers to less than or equal to about 100 micrometers, and wherein the carbon membrane has a porosity of greater than or equal to about 30% to less than or equal to about 90%.

9. The electrode according to claim 1, wherein the first portion of the carbon membrane is modified by laser ablation or wet chemistry oxidation.

10. The electrode according to claim 1, wherein the carbon membrane defines a carbon matrix extending between the first face and the opposing second face, and wherein the carbon matrix is defined by an intermingled web of carbon nanotubes, carbon nanofibers, carbon paper, graphene paper, or a combination thereof.

11. The electrode according to claim 1, wherein the first face and the opposing second face of the carbon membrane have a complex three-dimensional microstructure with a relatively high surface area as compared to the surface area of the carbon membrane when unmodified.

12. The electrode according to claim 1, further comprising a plurality of solid-state electrolyte particles disposed at nucleation sites within the first portion of the carbon membrane extending between the first face and the opposing second face.

13. The electrode according to claim 1, wherein the carbon membrane consists of carbon.

14. An electrode for an electrochemical cell, the electrode comprising:
    a single layered carbon material having a first face and an opposing second face, the carbon material comprising greater than or equal to 95% carbon and being defined by carbon nanotubes, carbon nanofibers, carbon paper, graphene paper, or combinations thereof,
    wherein a first portion of the carbon material extending between the first face and the opposing second face is modified such that the first portion of the carbon material extending between the first face and the opposing second face includes an elevated number of nucleation sites for lithium relative to a second portion of the carbon material when unmodified,
    wherein the first portion of the carbon material extending between the first face and the opposing second face is physically and/or chemically modified by laser ablation, contact with oxygen plasma, wet chemistry oxidation, or a combination thereof, and
    wherein the first portion of the carbon material that is modified defines the electrode and the second portion of the carbon material that is unmodified defines a current collector.

15. The electrode according to claim 14, wherein the electrode exhibits a state of charge (SOC) of greater than or equal to about 75% after 15 minutes of charging, and wherein the electrode exhibits a volume change of less than or equal to about 20% during lithium plating and stripping.

16. A method of fabricating an electrode, the method comprising:
    obtaining a single layered carbon material having a first face and an opposing second face, the carbon material comprising greater than or equal to 95% carbon and being defined by carbon nanotubes, carbon nanofibers, carbon paper, graphene paper, or combinations thereof, and
    modifying a first portion of the carbon material extending between the first face and the opposing second face such that the first portion of the carbon material extending between the first face and the opposing second face includes an elevated number of nucleation sites for lithium relative to a second portion of the carbon material that is unmodified,
    wherein the first portion of the carbon material that is modified defines the electrode and the second portion of the carbon material that is unmodified defines a current collector.

17. The method according to claim 16, wherein modifying the first portion of the carbon material induces defects into the carbon material and is performed by laser ablation, contact with oxygen plasma, wet chemistry oxidation, or a combination thereof.

18. The method according to claim 16, wherein the carbon material comprises a first surface portion extending along the first face, a second surface portion extending along the opposing second face, and a center portion extending between the first surface portion and the second surface portion and between the first face and the opposing second face, and wherein modifying the first portion of the carbon material comprises modifying the first surface portion and the second surface portion without modifying the center portion.

19. The method according to claim 16, further comprising:
    incorporating lithium into the first portion of the carbon material extending between the first face and the opposing second face by vacuum infiltration, electrochemical plating, thermal evaporation, lithium foil lamination, or combinations thereof.

* * * * *